United States Patent
Sugrue et al.

(10) Patent No.: US 6,998,543 B2
(45) Date of Patent: Feb. 14, 2006

(54) FOLDING PLATTER FOR POSTAL WEIGHING SCALE

(75) Inventors: Joseph B. Sugrue, Fairfield, CT (US); David W. Beckstrom, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 202 days.

(21) Appl. No.: 10/668,802

(22) Filed: Sep. 23, 2003

(65) Prior Publication Data
US 2005/0061556 A1     Mar. 24, 2005

(51) Int. Cl.
*G01G 21/22*     (2006.01)

(52) U.S. Cl. ...................... 177/126; 177/262

(58) Field of Classification Search ................ 177/126, 177/262
See application file for complete search history.

(56) References Cited

U.S. PATENT DOCUMENTS

| | | | | |
|---|---|---|---|---|
| 2,931,640 A | * | 4/1960 | Riddle, Jr. | 177/262 |
| 3,106,975 A | * | 10/1963 | Madigan | 177/126 |
| 4,602,693 A | * | 7/1986 | Racicot | 177/262 |
| 4,696,360 A | * | 9/1987 | Homen | 177/262 |
| 5,001,648 A | | 3/1991 | Baker | 705/407 |
| 5,050,694 A | * | 9/1991 | Liang | 177/262 |
| 5,434,367 A | * | 7/1995 | Salini | 177/189 |
| 5,496,972 A | * | 3/1996 | Demar et al. | 177/126 |
| 6,833,515 B1 | * | 12/2004 | Kesselman | 177/126 |

* cited by examiner

*Primary Examiner*—Randy W. Gibson
(74) *Attorney, Agent, or Firm*—Brian A. Lemm; Angelo N. Chaclas

(57) ABSTRACT

A platter for a weighing scale includes a base and a plurality of legs which extend downwardly from the base. The platter also includes at least one hinged member mounted on the base and movable between a horizontal position and an unfolded position in which the hinged member extends upwardly from the base. When unfolded, the hinged member may aid in supporting a stack of letters on the weighing scale.

8 Claims, 5 Drawing Sheets

FOLDING PLATTER FOR POSTAL WEIGHING SCALE

BACKGROUND

This invention relates generally to postal weighing scales, and more particularly to scales that are operable both to weigh parcels and to weigh a number of small mailpieces in a differential weighing mode.

Postal weighing scales are well known. Generally the function of such a scale is to output a signal that indicates the weight of a mailpiece weighed on the scale. The weight signal may be output via a human-readable display, and a human operator may read the display and enter corresponding data into a postage meter so that the postage meter applies a proper amount of postage to the mailpiece.

In a more automated system, the scale may be connected to the postage meter via a signal path, and the scale may output a mailpiece weight signal directly to the postage meter. The meter then calculates and applies postage accordingly.

Some postal scales are arranged to weigh both relatively small mailpieces, such as standard no. 10 envelopes that enclose letters and weigh an ounce or two, as well as relatively large mailpieces, such as parcels weighing one to five pounds or more.

FIG. 1 is a simplified schematic side view of a conventional postal scale, which is generally indicated by reference numeral 100. The scale 100 includes a load cell 102 which is mounted via its fixed end 104 to a mounting pad 106. A weight distribution plate 108 is mounted on the free end 110 of the load cell 102. A weighing platter 112 is supported on the weight distribution plate 108. The platter 112 has an upper surface 114 on which mailpieces may be placed for weighing by the scale 100.

The housing of the scale 100 is indicated in phantom at 116. Other components of the scale, which are not shown or not separately shown, may include: a transducer (e.g., a strain gage) which may be a part of the load cell 102 which translates strain in the load cell 102 into a raw weight signal; signal conditioning and processing circuitry which processes the raw weight signal from the transducer to generate a meaningful weight signal, a data interface by which the scale 100 may communicate a weight signal to an external device such as a postage meter (not shown), and a user interface.

One known technique used for weighing mailpieces is referred to as "differential weighing". In differential weighing, a batch of mailpieces (typically letters) is placed on the scale platter. Mailpieces are removed one-by-one from the scale platter and fed to a postage meter. As each mailpiece is removed from the scale platter, the scale detects, and determines the amount of, the reduction of the load on the platter. The detected reduction in load is, in effect, ascribed as the weight of the removed mailpiece and a corresponding weight signal is sent from the scale to the postage meter to allow the meter to calculate the appropriate amount of postage for the mailpiece. (Alternatively, the weight signal that corresponds to the reduction in load may be output on a display to the human operator.)

Differential weighing may be a more convenient and rapid way to weigh each mailpiece of a batch of mailpieces than placing the mailpieces on the scale platter one-by-one.

Typically when differential weighing is to be employed, a stack of envelopes may be placed on the scale platter. However, unless the stack is quite small, the stack may be unstable and likely to be upset after placement on the platter or as envelopes are removed from the stack, leading to inconvenience for the human operator and disruption of the differential weighing process.

SUMMARY

Accordingly, an improved platter for a postal weighing scale is provided. The platter includes a base, a plurality of legs extending downwardly from the base, and at least one hinged member mounted on the base and movable between a first position in which the hinged member is substantially horizontal and a second position in which the hinged member extends upwardly from the base.

The at least one hinged member may include a first hinged member mounted to a first edge of the base and a second hinged member mounted to a second edge of the base that is opposite to the first edge. The first hinged member may be movable between a first member first position in which the first hinged member extends substantially horizontally toward the second edge of the base and a first member second position in which the first hinged member extends upwardly from the base. The second hinged member may be movable between a second member first position in which the second hinged member extends substantially horizontally toward the first edge of the base and a second member second position in which the second hinged member extends upwardly from the base.

The first hinged member may include a first side that faces upward when the first hinged member is in the first member first position and a second side that faces downward when the first hinged member is in the first member first position. The second hinged member may include a first side that faces upward when the second hinged member is in the second member first position and a second side that faces downward when the second hinged member is in the second member first position. The respective first sides of the first and second hinged members may define a surface for supporting a parcel to be weighed by the weighing scale when the first hinged member is in the first member first position and the second hinged member is in the second member first position. An upper surface of the base, the second side of the first hinged member and the second side of the second hinged member may define a cradle for holding a plurality of mailpieces to be differentially weighed by the weighing scale, when the first hinged member is in the first member second position and the second hinged member is in the second member second position.

In another aspect, an improved weighing scale includes a load cell, a platter for supporting at least one mailpiece to be weighed by the weighing scale, and a structure for mounting the platter on the load cell. The platter includes a base and at least one hinged member mounted on the base and movable between a first position in which the hinged member is substantially horizontal and a second position in which the hinged member extends upwardly from the base.

With a platter or scale in accordance with the invention, the scale platter may be easily reconfigured either to stably support a stack of letters to be differentially weighed, or to support a parcel to be weighed.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

A platter for a postal weighing scale includes, in accordance with the invention, at least one hinged member. The hinged member, when lowered to a generally horizontal position, may conveniently support a parcel to be weighed on an upper surface of the hinged member. When the hinged member is raised to an upright position, it may provide support for a stack of envelopes to be differentially weighed. The presence of the upright hinged member may provide stability for the stack of envelopes so that the envelopes do not slide off the platter prior to or during the differential weighing process.

Figure 2:
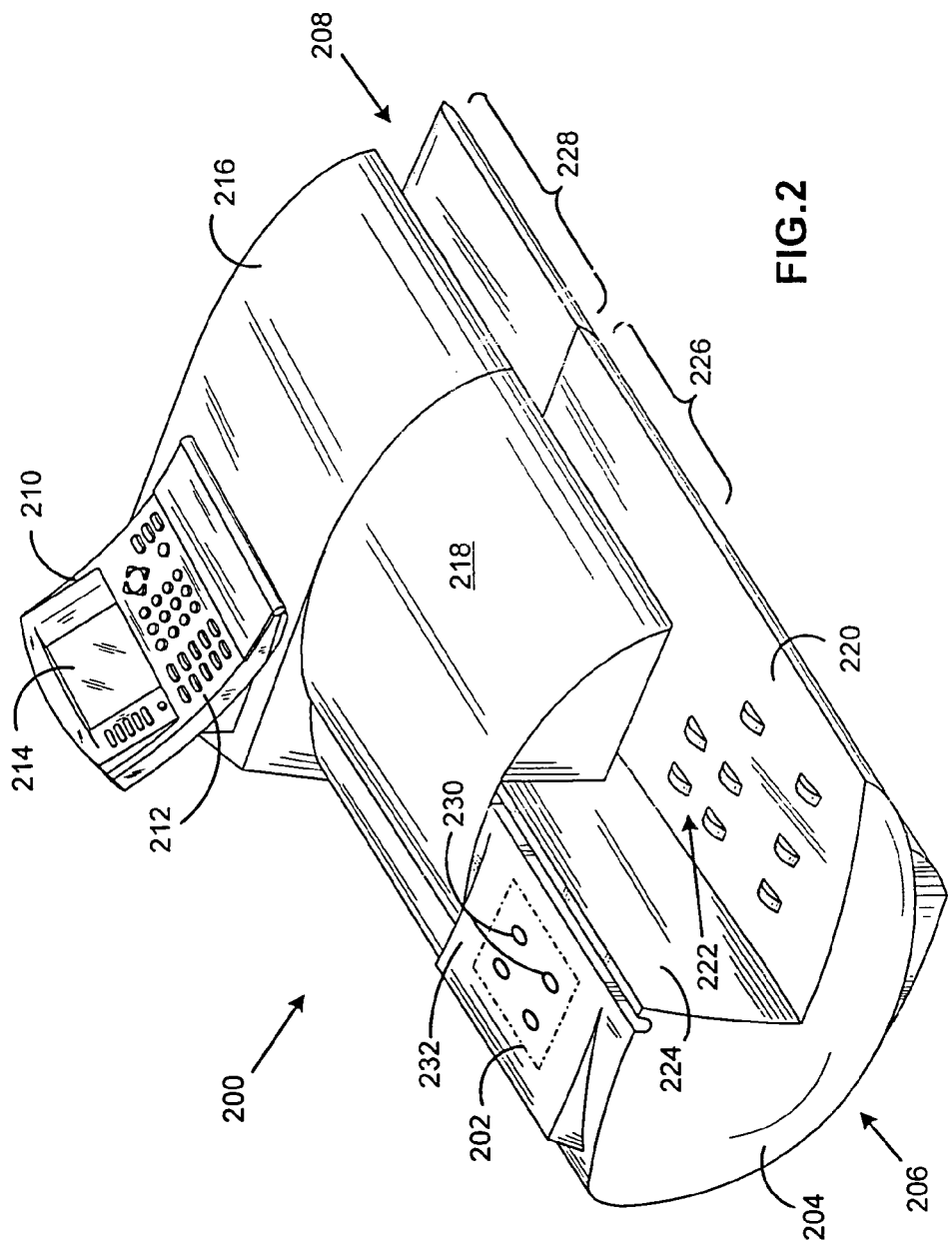
FIG. 2 is a perspective view of a mailing machine provided in accordance with the invention.

Referring now to FIG. 2, the reference numeral 200 indicates generally a typical mailing machine on which there may be mounted a weighing scale platter provided in accordance with the invention. The weighing scale platter is schematically illustrated in phantom in FIG. 2 and is indicated by the reference numeral 202. The mailing machine 200 includes a base unit generally designated by the reference numeral 204. The base unit 204 has an envelope infeed end, generally designated by the reference numeral 206 and an envelope outfeed end, designated generally by the reference numeral 208. A control unit 210 is mounted on the base unit 204, and includes one or more input/output devices, such as, for example, a keyboard 212 and a display device 214.

Figure 1:
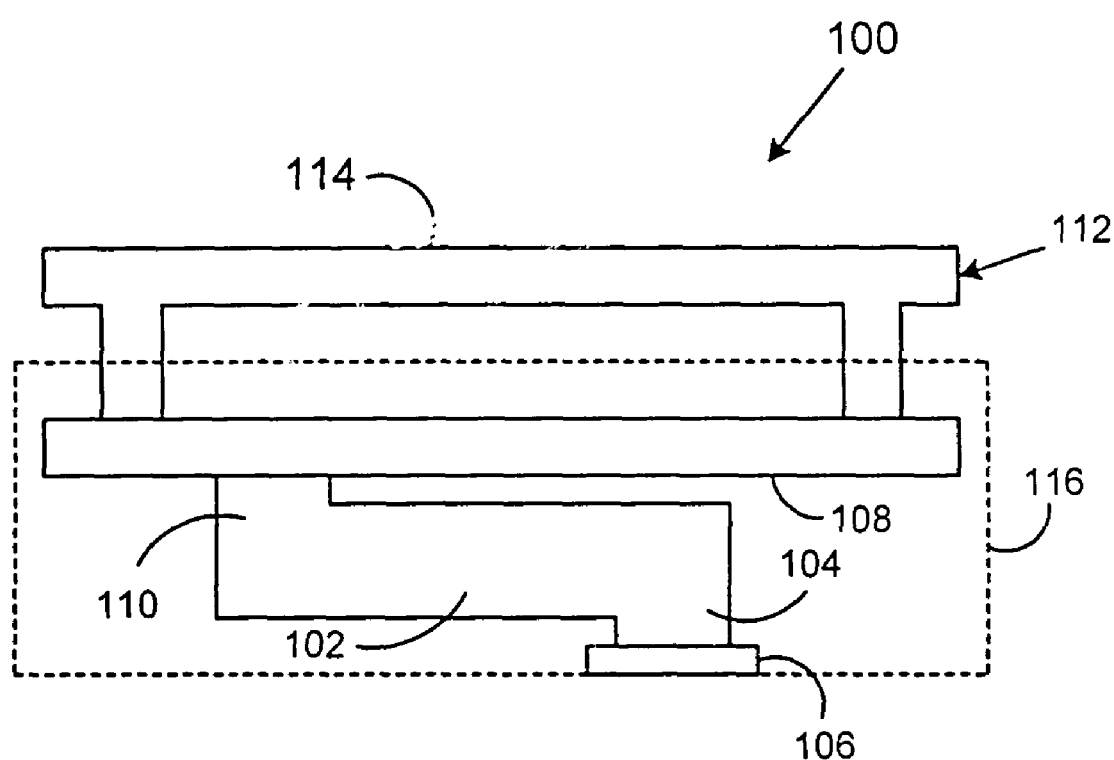
FIG. 1 is a simplified schematic side view of a conventional postal weighing scale.

Cover members 216, 218 are pivotally mounted on the base 204 and are moveable between a closed position shown in FIG. 1 and an open position (not shown). In the open position of the cover members 216, 218, various operating components and parts are exposed for service and/or repair as needed. A mailpiece transport mechanism, which is not visible in FIG. 1, is housed under the cover members 216, 218.

The base unit 204 further includes a generally horizontal feed deck 220 which extends substantially from the infeed end 206 to the outfeed end 208. A plurality of nudger rollers 222 are suitably mounted under the feed deck 220 and project upwardly through openings in the feed deck so that the rollers 222 can exert a forward feeding force on a succession of mailpieces placed in the infeed end 206. A vertical wall 224 defines a mailpiece stacking location from which the mailpieces are fed by the nudger rollers 222 along the feed deck 220 and into the transport mechanism referred to above. The transport mechanism transports the mailpieces through one or more modules, such as, for example, a separator module and moistening/sealing module. Each of these modules is located generally in the area indicated by reference numeral 226. The mailpieces are then passed to a metering/printing module located generally in the area indicated by reference numeral 228.

Above and adjacent to the vertical wall 224, the base unit 204 includes a platform 232 in which holes 230 are formed to receive legs (not shown in FIG. 2) of the weighing scale platter 202. Components of a postal weighing scale other than the platter 202, including a load cell and related electronics, may be hidden below the platform 232 and behind the vertical wall 224.

When a number of envelopes of uniform, known weight are to be processed by the mailing machine 200, suitable data indicating the weight of the envelopes may be entered into the control unit 210 and a stack of the envelopes may be placed on the feed deck 220 adjacent the wall 224, to be fed seriatim by the nudger rollers 222 into the transport mechanism under the covers 218, 216 for sealing and metering.

If a batch of envelopes of varying weights is to be processed, a stack of such envelopes may be placed on the platter 202 for differential weighing, as described above. Details of the platter will now be described with reference to FIGS. 3–6.

Figure 3:
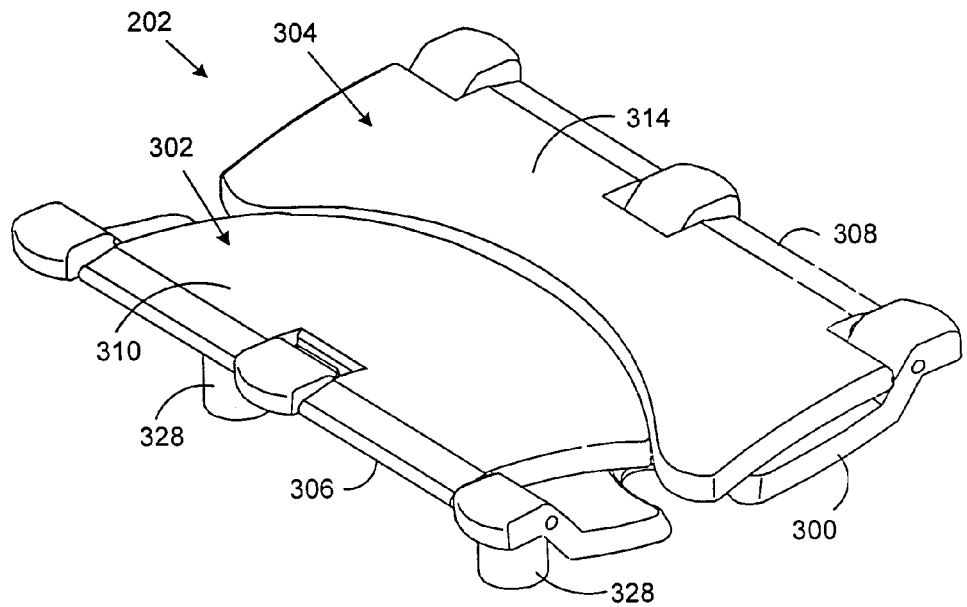
FIG. 3 is a perspective view of a weighing scale platter provided in accordance with the invention and which may be installed on the mailing machine of FIG. 2, the platter being shown in FIG. 3 in a configuration to support a parcel to be weighed.
Figure 4:
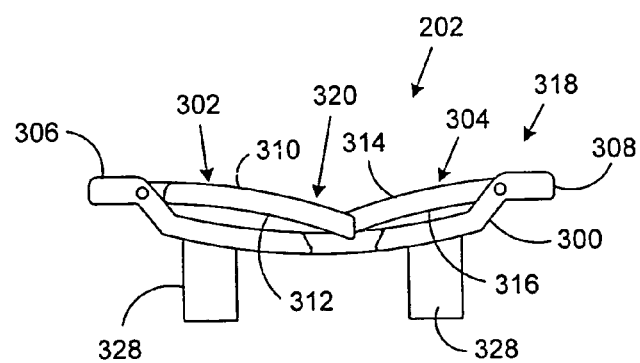
FIG. 4 is a side view of the platter of FIG. 3, in the same configuration as in FIG. 3.
Figure 5:
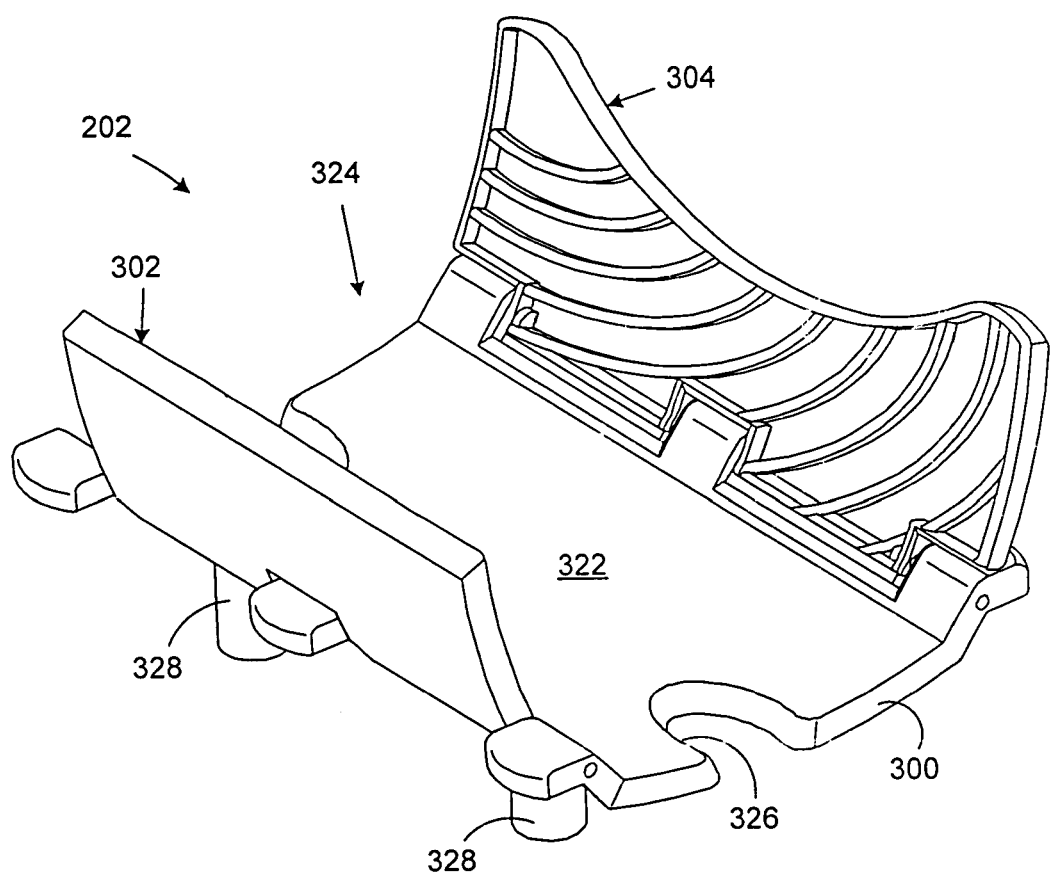
FIG. 5 is a view similar to FIG. 3, showing the platter in a configuration to receive a stack of envelopes to be differentially weighed.
Figure 6:
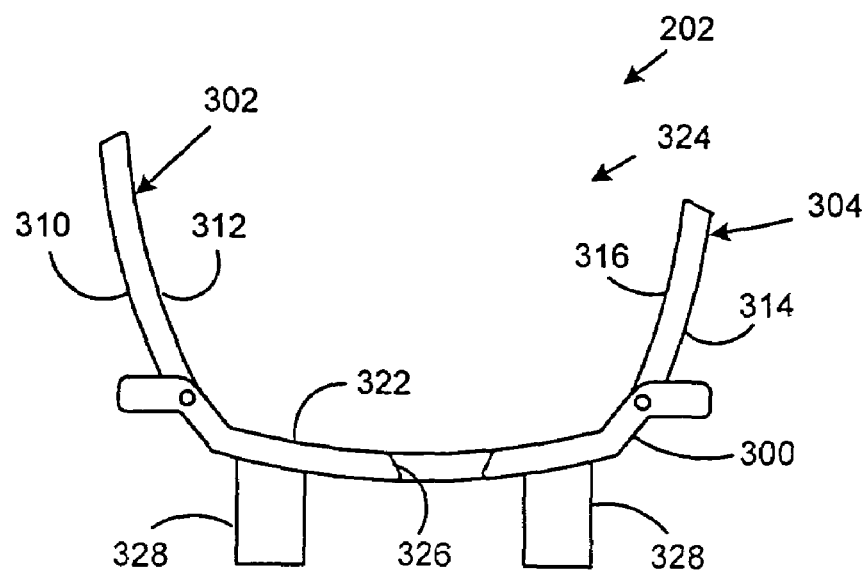
FIG. 6 is a view similar to FIG. 4, showing the platter in the same configuration as in FIG. 5.

FIG. 3 is a perspective view of the platter 202, and FIG. 4 is a side view of the platter 202, both showing the platter in a closed configuration suitable for supporting a single mailpiece such as a parcel to be weighed. FIG. 5 is another perspective view of the platter 202 and FIG. 6 is another side view of the platter. In FIGS. 5 and 6 the platter is shown in an open configuration, suitable for receiving a stack or pile of envelopes to be differentially weighed.

The platter 202 includes a base 300, as best seen in FIGS. 4–6, which may be generally planar, except for a concavity at a central portion of the base. With the concavity, the base may be regarded generally as a shallow open-topped box, having short side walls at long sides of the box and being open at short sides of the box. In alternative embodiments, the base 300 may be more nearly, or substantially perfectly, planar.

The platter 202 further includes hinged members 302, 304. The hinged member 302 is mounted to a first edge 306 of the base 300, and the hinged member 304 is mounted to a second edge 308 of the base 300. The second edge 308 is opposite to the first edge 306.

When the platter 202 is in its closed configuration, the hinged member 302 is in a substantially horizontal position (FIGS. 3 and 4) in which the hinged member 302 extends substantially horizontally toward the second edge 308 of the base 300, and the hinged member 304 is also in a substantially horizontal position in which the hinged member 304 extends substantially horizontally toward the first edge 306 of the base 300. When the platter is in its open configuration, the hinged member 302 is in an unfolded position (FIGS. 5 and 6), in which the hinged member 302 extends upwardly from the base 300, and the hinged member 304 is also in an unfolded position in which the hinged member 304 extends upwardly from the base 300. It will be appreciated that the hinged member 302 is movable between the horizontal and unfolded positions shown in the drawings, and that the hinged member 304 is also movable between the horizontal and unfolded positions shown in the drawings.

The hinged member 302 includes an outer side 310 (FIGS. 3 and 4) that faces upward when the hinged member 302 is in its horizontal position and an inner side 312 (FIG. 4) that faces downward when the hinged member 302 is in its horizontal position. The hinged member 304 includes an outer side 314 (FIGS. 3 and 4) that faces upward when the hinged member 304 is in its horizontal position and an inner side 316 (FIG. 4) that faces downward when the hinged member 304 is in its horizontal position.

When the platter 202 is in its closed configuration (i.e., with both hinged members 302, 304 in their horizontal positions), the outer sides 310, 314 of the members 302, 304 define a surface 318 (FIG. 4) which is close to being planar and which is suitable for supporting a rather large mailpiece such as a parcel to be weighed by the scale on which the platter 202 is supported. When the platter is in its closed configuration, the hinged members 302, 304 may tilt downwardly toward the center of the platter 202 to a small degree so as to form a shallow valley 320 in the parcel-supporting surface 318. The valley 320 may aid in retaining roll (long cylindrical shaped) parcels on the surface 318 and may be shallow enough so as not to compromise the suitability of the surface 318 for supporting standard rectangular parcels.

Referring now to FIGS. 5 and 6, when the platter 202 is in its open configuration, with the members 302, 304 in their unfolded positions, the upper surface 322 of the base 300, the inner side 312 of the member 302 and the inner side 316 of the member 304 define a cradle 324 that is suitable for holding a stack, or even an untidy pile, of letter-shaped mailpieces that are to be differentially weighed by the scale on which the platter 202 is supported.

For added convenience in picking up individual letters from a stack of letters held by the platter 202, each short side of the base 300 may, in some embodiments, have a scallop 326 formed at a central portion of the short side (only one of the two scallops 326 is visible in the drawings).

The respective free ends of the members 302, 304 may have complementary curved shapes, such as a convex curve at the free end of the member 302 and a concave curve at the free end of the member 304. However, in other embodiments, all of the base 300, and the members 302, 304 may have more or less strictly planar and rectangular shapes.

The platter 202 also includes a plurality of legs 328 which extend downwardly from the base 300 and by which the base 300 may be supported on a weight distribution plate or the like.

In some embodiments, one of the two hinged members 302, 304 may be dispensed with, and the remaining hinged member may alone provide suitable support and stabilization for a stack or heap of letters to be held on the platter and differentially weighed. If only one hinged member is provided, its length from hinged end to free end may be extended so as to mostly or completely cover the base 300 when the hinged member is in its horizontal position.

In other embodiments, more than two hinged members (e.g., four triangular hinged members meeting at the center of the base when folded) may be provided.

Figure 7:
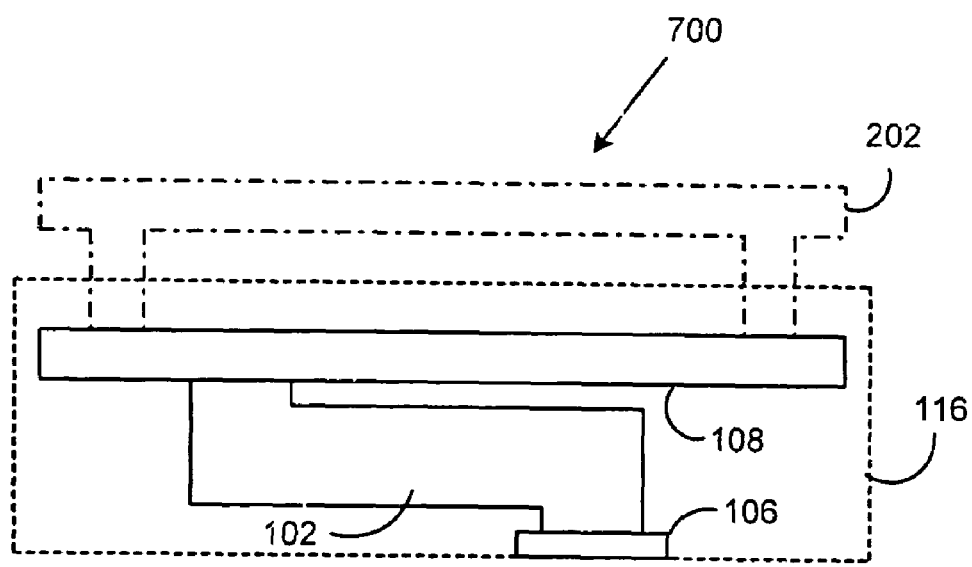
FIG. 7 is a simplified schematic side view of a postal weighing scale provided in accordance with the invention.

FIG. 7 is a simplified schematic side view of a postal weighing scale 700 that may be provided in accordance with the invention. The scale 700 may be identical to the conventional scale 100 shown in FIG. 1, with the exception that in the scale 700, the platter 202 (shown schematically with dot-dash lines in FIG. 7) of FIGS. 3–6 replaces the conventional platter 112 shown in FIG. 1. The scale of FIG. 7 may also be considered to represent mailpiece weighing components of the mailing machine 200.

A weighing scale platter according to the present invention may have greater versatility than conventional scale platters. When closed, the platter of the present invention may provide a suitable, generally planar surface to support a relatively large parcel for weighing. When opened to form a cradle, the platter may support a large and/or untidy stack or pile of letters for differential weighing with a considerable degree of security against the possibility of one or more of the letters sliding off the platter. As a result, differential weighing operations may be made easier and more convenient for the scale operator.

A number of embodiments of the present invention have been described. Nevertheless, it will be understood that various modifications may be made without departing from the spirit and scope of the invention. Accordingly, other embodiments are within the scope of the following claims.

What is claimed is:

1. A platter for a weighing scale, comprising:
   a base;
   a plurality of legs extending downwardly from the base;
   a first hinged member mounted to a first edge of the base, the first hinged member being movable between a first member first position in which the first hinged member extends substantially horizontally toward a second edge of the base that is opposite to the first edge of the base and a first member second position in which the first hinged member extends upwardly from the base, the first hinged member including a first side that faces upward when the first hinged member is in the first member first position and a second side that faces downward when the first hinged member is in the first member first position;
   a second hinged member mounted to the second edge of the base, the second hinged member being movable between a second member first position in which the second hinged member extends substantially horizontally toward the first edge of the base and a second member second position in which the second hinged member extends upwardly from the base, the second hinged member including a first side that faces upward when the second hinged member is in the second member first position and a second side that faces downward when the second hinged member is in the second member first position;
   a first surface for supporting an item to be weighed by the weighing scale, the first surface being formed by at least a portion of the first side of the first hinged member and at least a portion of the first side of the second hinged member when the first hinged member is in the first member first position and the second hinged member is in the second member first position; and
   a cradle for holding a plurality of items to be weighed by the weighing scale, the cradle being formed by an upper surface of the base, the second side of the first hinged member and the second side of the second hinged member when the first hinged member is in the first member second position and the second hinged member is in the second member second position.

2. The platter according to claim 1, further comprising:
   a valley in the first surface for supporting an item to be weighed, the valley being formed between the first side of the first hinged member and the first side of the second hinged member by the first hinged member tilting downwardly towards the upper surface of the base when the first hinged member is in the first member first positions and the second hinged member tilting downwardly towards the upper surface of the base when the second hinged member is in the second member first position.

3. A weighing scale, comprising:
a load cell;
a platter for supporting at least one mailpiece to be weighed by the weighing scale; and
means for mounting the platter on the load cell;
wherein the platter comprises:
   a base having a first edge and a second edge that is opposite to the first edge;
   a first hinged member mounted to the first edge of the base, the first hinged member being movable between a first member first position in which the first hinged member extends substantially horizontally toward the second edge of the base and a first member second position in which the first hinged member extends upwardly from the base, the first hinged member including a first side that faces upward when the first hinged member is in the first member first position and a second side that faces downward when the first hinged member is in the first member first position;
   a second hinged member mounted to the second edge of the base, the second hinged member being movable between a second member first position in which the second hinged member extends substantially horizontally toward the first edge of the base and a second member second position in which the second hinged member extends upwardly from the base, the second hinged member including a first side that faces upward when the second hinged member is in the second member first position and a second side that faces downward when the second hinged member is in the second member first position;
   a first surface for supporting an item to be weighed by the weighing scale, the first surface being formed by at least a portion of the first side of the first hinged member and at least a portion of the first side of the second hinged member when the first hinged member is in the first member first position and the second hinged member is in the second member first position; and
   a cradle for holding a plurality of items to be weighed by the weighing scale, the cradle being formed by an upper surface of the base, the second side of the first hinged member and the second side of the second hinged member when the first hinged member is in the first member second position and the second hinged member is in the second member second position.

4. The weighing scale according to claim 3, further comprising:
a valley in the first surface for supporting an item to be weighed, the valley being formed between the first side of the first hinged member and the first side of the second hinged member by the first hinged member tilting downwardly towards the upper surface of the base when the first hinged member is in the first member first position and the second hinged tilting downwardly towards the upper surface of the base when the second hinged member is in the second member first position.

5. A mailing machine comprising:
a control unit for controlling operation of the mailing machine, the control unit adapted to operate the mailing machine at least in a differential weighing mode; and
a scale coupled to the control unit, the scale including a platter for supporting at least one mail piece for weighing, the platter further comprising:
   a base having a first edge and a second edge that is opposite to the first edge;
   a first hinged member mounted to the first edge of the base, the first hinged member being movable between a first member first position in which the first hinged member extends substantially horizontally toward the second edge of the base and a first member second position in which the first hinged member extends upwardly from the base, the first hinged member including a first side that faces upward when the first hinged member is in the first member first position and a second side that faces downward when the first hinged member is in the first member first position;
   a second hinged member mounted to the second edge of the base, the second hinged member being movable between a second member first position in which the second hinged member extends substantially horizontally toward the first edge of the base and a second member second position in which the second hinged member extends upwardly from the base, the second hinged member including a first side that faces upward when the second hinged member is in the second member first position and a second side that faces downward when the second hinged member is in the second member first position;
   a first surface for supporting an item to be weighed by the weighing scale, the first surface being formed by at least a portion of the first side of the first hinged member and at least a portion of the first side of the second hinged member when the first hinged member is in the first member first position and the second hinged member is in the second member first position; and
   a cradle for holding a plurality of items to be weighed by the weighing scale, the cradle being formed by an upper surface of the base, the second side of the first hinged member and the second side of the second hinged member when the first hinged member is in the first member second position and the second hinged member is in the second member second position.

6. The mailing machine according to claim 5, further comprising:
a base unit,
wherein the control unit and scale are mounted on the base unit.

7. A method of operating a mailing machine comprising:
placing the mailing machine in a differential weighing mode;
configuring a weighing platter of the mailing machine into a cradle for receiving a plurality of mail pieces by moving a first hinged member of the weighing platter from a first position in which the first hinged member is substantially horizontal with respect to a base of the weighing platter to a second position in which the first hinged member extends upwardly from the base and by moving a second hinged member of the weighing platter from a first position in which the second hinged member is substantially horizontal with respect to the base of the weighing platter to a second position in which the second hinged member is extends upwardly from the base, the first hinged member, second hinged member and base thereby forming the cradle; and placing the plurality of mail pieces in the cradle.

8. The method according to claim 7, further comprising:

removing a first one of the plurality of mail pieces from the cradle, wherein the mailing machine, in response to the removal of the first one of the plurality of mail pieces being removed, differentially determines the weight of the first one of the plurality of mail pieces; and feeding the first one of the plurality of mail pieces into the mailing machine.

* * * * *